Figure 1:
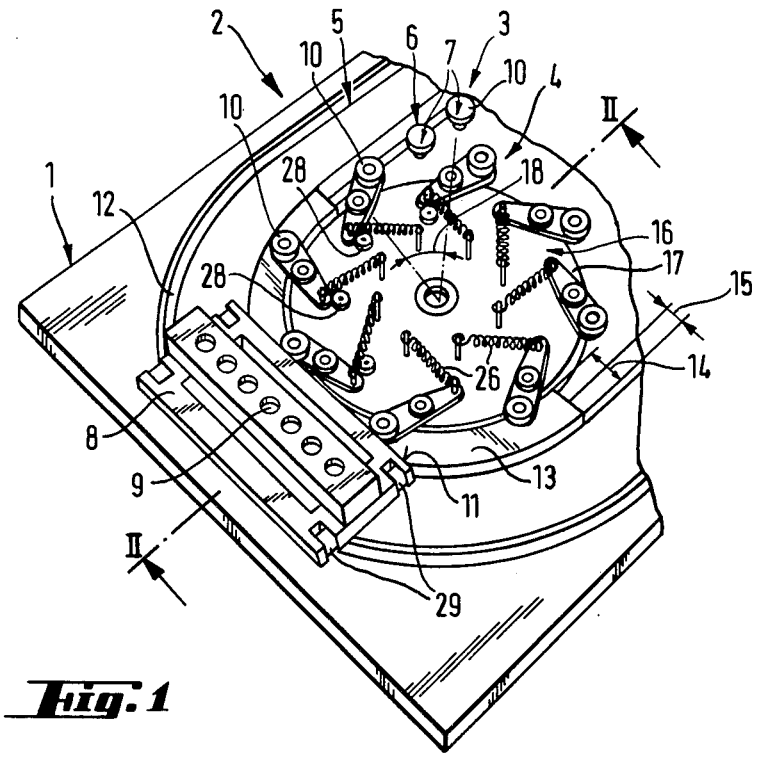

United States Patent [19]

Sticht

[11] Patent Number: 4,619,205
[45] Date of Patent: Oct. 28, 1986

[54] CONVEYOR ARRANGEMENT

[75] Inventor: Walter Sticht, Attnang-Puchheim, Austria

[73] Assignee: STIWA-Fertigungstechnik Sticht GesmbH, Attnang-Puchheim, Austria

[21] Appl. No.: 591,560

[22] Filed: Mar. 20, 1984

[30] Foreign Application Priority Data

Mar. 29, 1983 [AT] Austria ................................ 1117/83
Feb. 6, 1984 [AT] Austria ................................ 360/84

[51] Int. Cl.⁴ ............................................. B61B 13/12
[52] U.S. Cl. .................................. 104/168; 104/165; 198/465.2; 198/480.1; 198/723
[58] Field of Search ................... 104/21, 35, 99, 165, 104/168; 198/472, 478, 723, 457, 481, 722, 465.1, 465.2, 480.1

[56] References Cited

U.S. PATENT DOCUMENTS

| | | | |
|---|---|---|---|
| 1,828,324 | 10/1931 | Kruse | 198/478 |
| 3,039,402 | 6/1962 | Richardson | 104/168 |
| 3,342,313 | 9/1967 | Dearsley | 198/722 |
| 3,361,083 | 1/1968 | Babson | 104/168 |
| 3,743,116 | 7/1973 | Giessler et al. | 104/165 X |
| 3,866,537 | 2/1975 | Minkwitz | 104/99 |
| 4,058,151 | 11/1977 | Yonezu | 198/722 X |

FOREIGN PATENT DOCUMENTS

| | | | |
|---|---|---|---|
| 161712 | 12/1980 | Japan | 104/165 |
| 2118127 | 10/1983 | United Kingdom | 198/472 |
| 439617 | 3/1975 | U.S.S.R. | 104/165 |

Primary Examiner—Randolph A. Reese
Attorney, Agent, or Firm—Kurt Kelman

[57] ABSTRACT

A conveyor arrangement for conveying a workpiece carrier in a conveying direction, the carrier having two opposite sides, and a guide for laterally guiding the carrier in this direction, the guide comprising a drive associated with one of the carrier sides for advancing the carrier in the conveying direction, the drive including a succession of entrainment elements engaging the one carrier side, and a guide track having two sides spaced apart in a direction transverse to the conveying direction and extending in the conveying direction, one of the guide track sides being opposite the drive in the transverse direction and the drive being biased towards the one guide track side, and guide elements mounted on the carrier and guided without play along the one guide track side.

11 Claims, 15 Drawing Figures

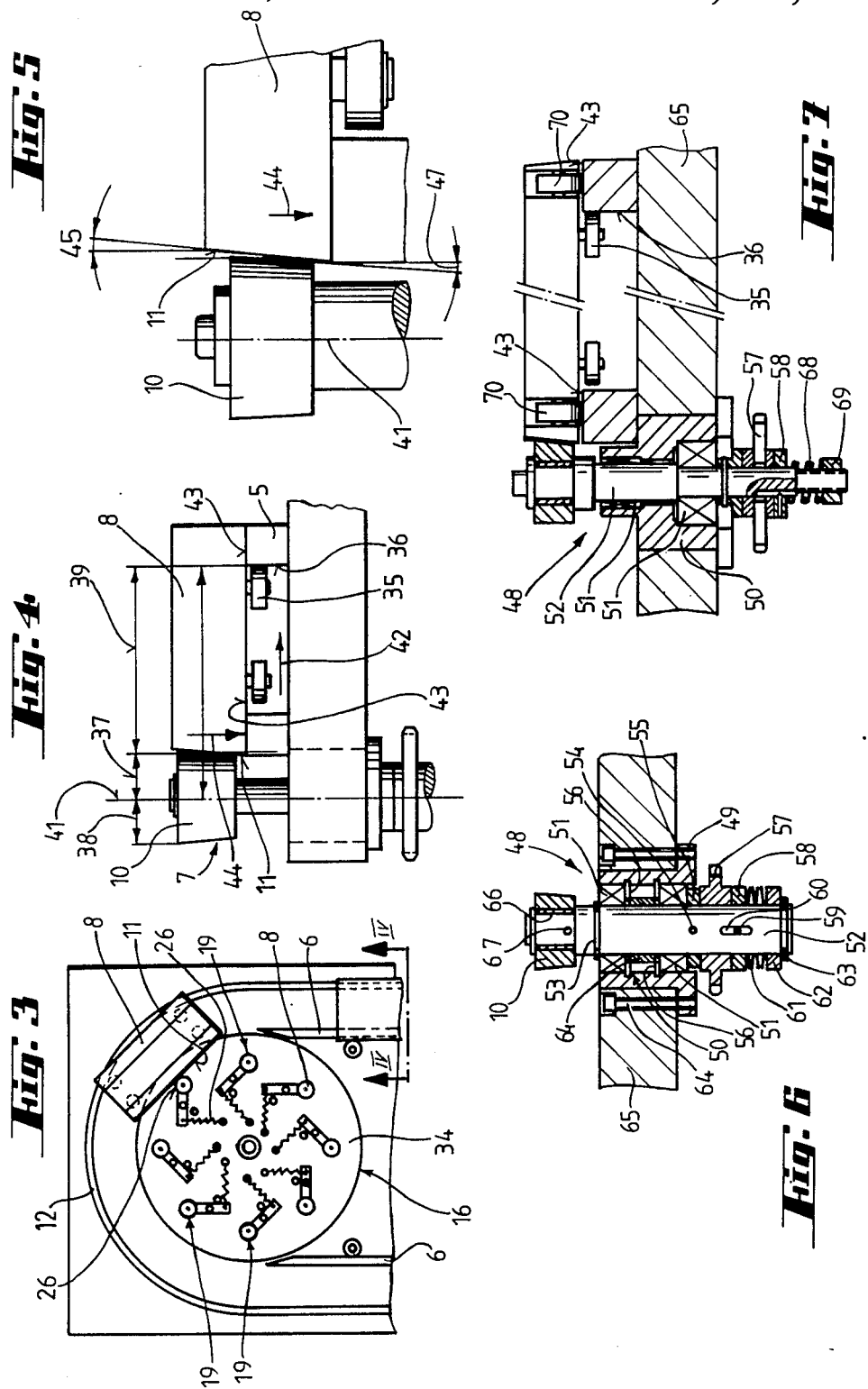

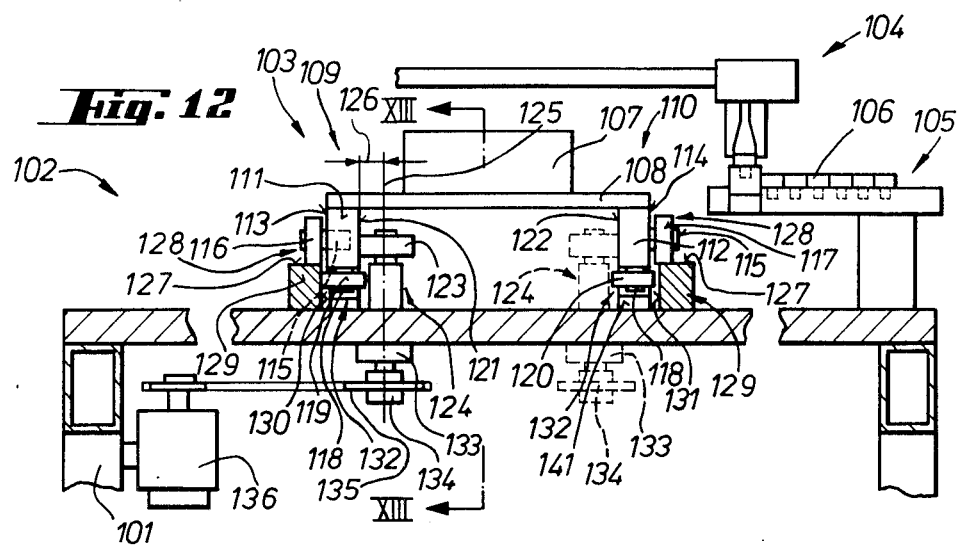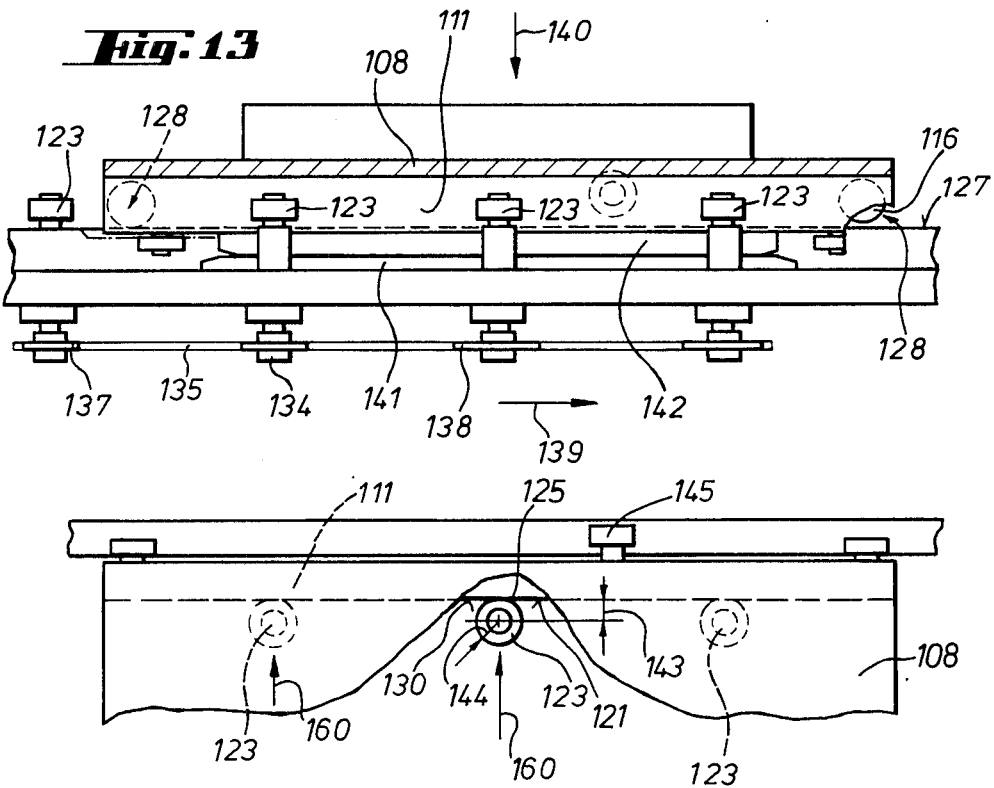

CONVEYOR ARRANGEMENT

The present invention relates to improvements in a conveyor arrangement for conveying a workpiece carrier in an assembly line in a conveying direction. The conveyor arrangement has a guide track having two sides spaced apart in a direction transverse to the conveying direction and extending in the conveying direction, and guide elements mounted on the carrier and guided without play along the one guide track for guiding the carrier laterally and/or vertically. Drive means advances the carrier in the conveying direction.

Such conveyors for manufacturing workpieces by assembling a plurality of parts in two or more stages have been disclosed, for example, in my U.S. Pat. Nos. 4,502,585, filed Nov. 7, 1979, and 4,442,297, filed Apr. 23, 1980, which describe a series of work station modules assembled in a linear conveying path. The guide track has two guide ledges each defining an upper face and a respective one of the sides for vertically and laterally guiding the carrier. Drive means in frictional engagement with the sides of the carrier are associated with each guide ledge, the drive means comprising drive elements spaced from each other in the conveying direction and the carriers being accessible from below along the assembly line. While the arrangements described in my prior patent applications have been used with great success, the lateral guidance of the carrier along both sides thereof and the drive means associated with both lateral guides has at times been difficult to mount because of space considerations and/or has been found to be costly.

It is accordingly an object of this invention to improve such conveyor arrangements so that they may be used universally at relatively low costs while assuring an exact lateral guidance of the carriers in the assembly line.

It is another object of the invention to reduce the wear on the advancing means and their entrainment elements.

The above and other objects are accomplished according to the present invention with a conveyor arrangement for conveying a workpiece carrier in a conveying direction, the carrier having two opposite sides, and a guide means for vertically and laterally guiding the carrier in this direction, the guide means comprising a means associated with one of the carrier sides for advancing the carrier in the conveying direction and including a succession of entrainment elements engaging the one carrier side, and a guide track having two sides spaced apart in a direction transverse to the conveying direction and extending in the conveying direction, one of the guide track sides being opposite the advancing means in the transverse direction and the advancing means being biased towards the one guide track side, and guide elements mounted on the carrier and guided without play along the one guide track side. The one guide track side may be associated with the one or the opposite carrier side.

This arrangement has the advantage that guidance of the carrier without play is assured while the power required for operating the advancing means has been considerably reduced. Furthermore, the wear on the entrainment elements is also reduced while a secure frictional engagement between these entrainment elements and the carrier side is readily assured by making the elements deformable or mounting them adjustably or yieldably in relation to the carrier side.

Figure 2:
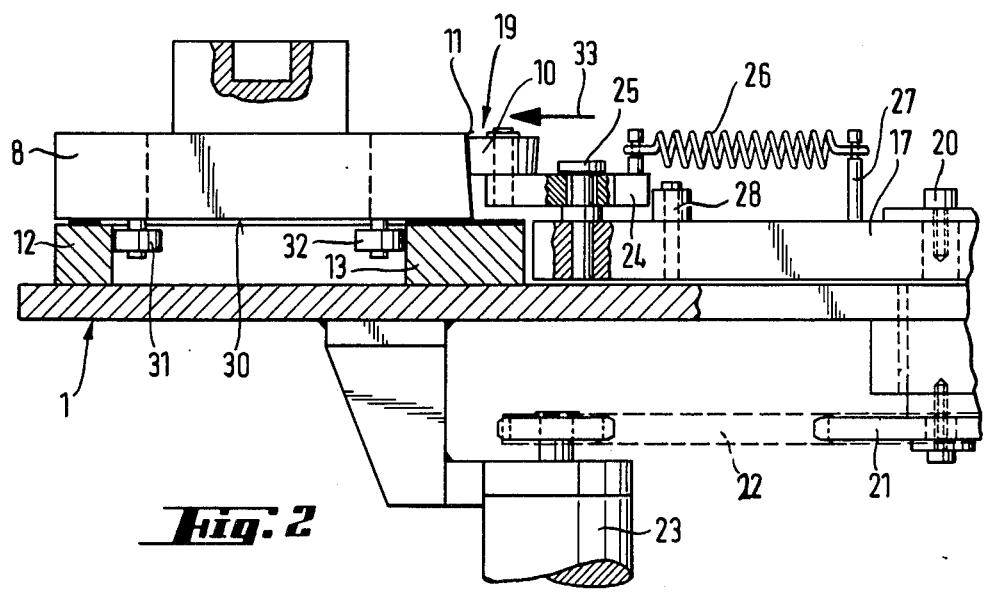
Figure 8:
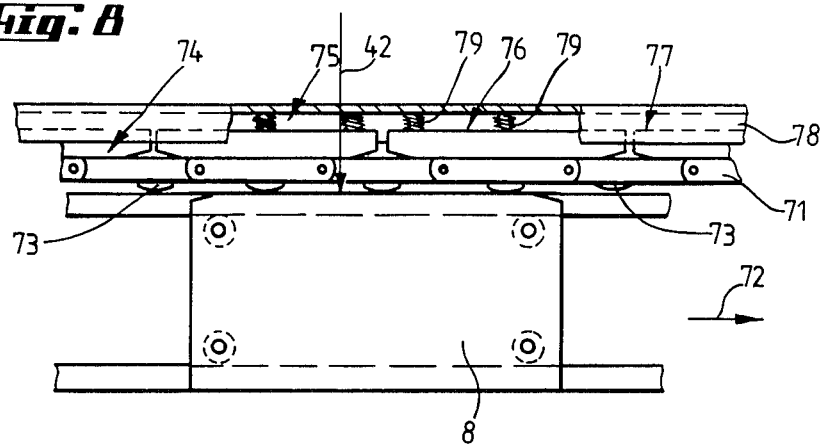
Figure 9:
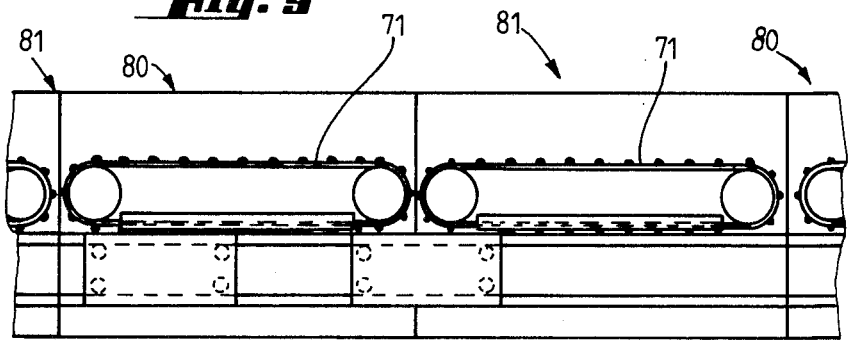
Figure 10:
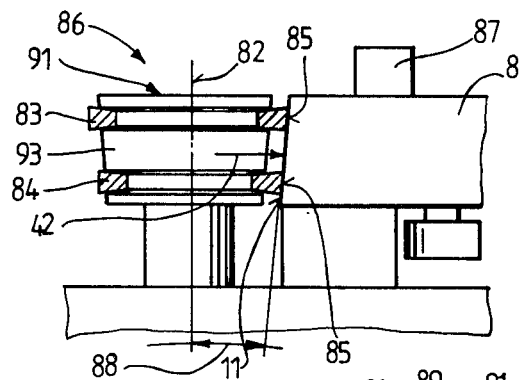
Figure 11:
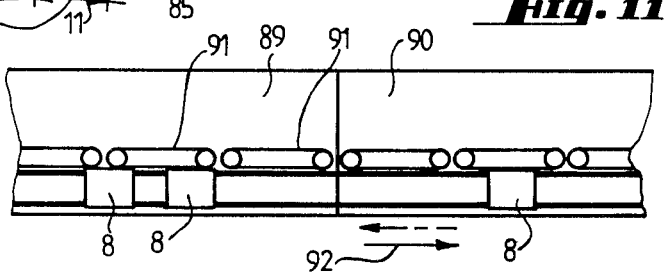
Figure 15:
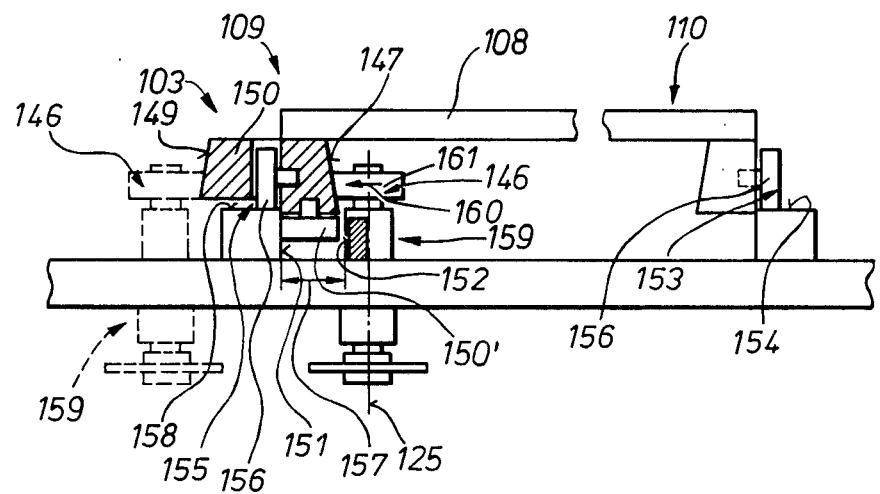

The above and other objects, advantages and features of this invention will become more apparent from the following description of certain now preferred embodiments thereof, taken in conjunction with the somewhat schematic drawing wherein FIG. 1 is a fragmentary perspective view of a conveyor arrangement wherein the advancing means includes a turntable with adjustable entrainment elements, FIG. 2 is a sectional view along line II—II of FIG. 1, FIG. 3 is a top view of a modification of the embodiment of FIG. 1, FIG. 4 is an end view along line IV—IV of FIG. 3, FIG. 5 is an enlarged view of a portion of the workpiece carrier and an associated conveyor roller according to FIG. 4, FIG. 6 is a fragmentary sectional view of a conveyor roller module, FIG. 7 is a like view of a modification of a conveyor roller module, FIG. 8 is a fragmentary top view of a conveyor arrangement with another embodiment of advancing means, FIG. 9 is a simplified top view of successive sections of the advancing means of FIG. 8, FIG. 10 is an end view, partly in section, of another embodiment of advancing means for a conveyor arrangement, FIG. 11 is a simplified top view of successive sections of the advancing means of FIG. 10, FIG. 12 is an end view, partly in section, of another embodiment of the conveyor arrangement advancing means, FIG. 13 is a sectional view along line XIII—XIII of FIG. 12, FIG. 14 is a fragmentary top view of the conveyor arrangement of FIGS. 12 and 13, with a partially illustrated workpiece carrier, and FIG. 15 shows an end view of a modified advancing means, partly in section.

Referring now to the drawing and first to FIGS. 1 and 2, there is shown work table 1 of assembly line 2 and conveyor arrangement 3 for conveying carrier 8 for workpieces 9 in a conveying direction. The carrier has two opposite sides and guide means vertically and laterally guides carrier 8 in this direction. The guide means comprises means 4 associated with carrier side 11 for advancing the carrier in the conveying direction and including a succession of entrainment elements 7, 10 engaging carrier side 11, and a guide track having two guide ledges 5, 6 forming sides spaced apart in a direction transverse to the conveying direction for laterally guiding the track, guide track side 5 being opposite advancing means 4 in the transverse direction and biased towards the one guide track side. Guide elements 31 (see FIG. 2) are mounted on carrier 8 and guided without play along the one guide track side which is associated with the side of the carrier opposite to side 11.

FIGS. 1 and 2 show a turning point of the conveyor at which two parallel courses of guide ledges 5, 6 are connected by guide ledges 12, 13 forming a semi-circular curve. A succession of entrainment elements 7 consisting of conveyor rollers 10 are arranged along guide ledges 6 in the two straight courses of the conveyor for advancing workpiece carrier 8 therealong, the conveyor rollers engaging carrier side 11. Carrier advancing means 4 on the inside of the curve includes turning transport device 16 consisting of turntable 17 and conveyor rollers 10 are circumferentially arranged on turntable 17 for engagement of successive ones of conveyor rollers 10 with carrier side 11 upon turning of the turntable. As shown, conveyor rollers 10 are adjustably positionable on the turntable in a direction transverse to the conveying direction to bias them in that direction towards opposite guide ledge 12. The turntable is rotatable about axis 20 and the conveyor rollers 10 are equidistantly arranged along the circumference of turntable 17 and are radially adjustably positionable thereon. The conveyor rollers are spaced apart by angles 18. The conveyor rollers are elastic guide rollers, for example of soft polyurethane. Curved guide ledge 13 vertically supporting and guiding carrier side 11 engaged by the conveyor rollers has a width 14 exceeding width 15 of straight guide ledge 6.

The arrangement of the turntable at the turning point has the advantage of enabling the carrier to be deflected from one straight course to another straight course of the conveyor while retaining the advancing means of this invention.

As shown in FIG. 2, turntable 17 is mounted on machine table 1 for rotation about vertical axle 20 which has pinion 21 keyed thereto, drive chain 22 being trained over pinion 21 and a pinion keyed to drive motor 23 affixed to the machine table for rotating the turntable. Any other suitable transmission means may be used for rotating the turntable. Entrainment element 19 on the turntable may be the same as entrainment elements 7 along the straight courses of the conveyor and are constituted by frusto-conical conveyor rollers 10 which are inwardly tapered towards table 1, carrier side 11 engaged by the conveyor rollers being inversely inclined for cooperation with the conveyor rollers whereby the advancing means biases carrier 8 towards the side of guide ledge 12 and guide rollers 31 are guided without play along the guide ledge side.

Pivotal arms 24 carry each conveyor roller 10, each pivotal arm having two ends and pivot 25 supporting the pivotal arm intermediate the ends thereof and substantially centrally on the turntable. Conveyor rollers 10 are mounted at one end of the pivotal arms and tension springs 26 connect the other end of the pivotal arms to bolt 27 affixed to the turntable. Adjustable stops 28 on turntable 17 determine a respective pivotal end position of arms 24 for adjustably positioning conveyor rollers 10. In this manner, the biasing force of the conveyor rollers against carrier side 11 may be simply equalized even when these sides are relatively long to form a chord in the curved section of the conveyor. Since the carrier moves on two guide ledges along the curved section, its vertical position will remain unchanged along the entire conveyor. Preferably, the turntable has a radius exceeding the distance between axis 20 of the turntable and an end position of entrainment elements 19 remote from the axis. This will reduce the power required for driving heavy carriers since the losses of driving force due to friction will be considerably reduced.

As is clear from the drawing, carrier side 11 forms a tangent to curved guide ledges 12, 13. The length of workpiece carrier 8 is preferably so selected that guide rollers 29 at the respective ends of the workpiece carrier, which vertically guide the carrier on straight guide ledges 6 are laterally adjacent curved guide ledges 12, and do not contact the guide ledges in the curve. Thus, as best seen in FIG. 2, underside 30 of carrier 8 simply glides along the upper side of guide ledge 13 in the curve while rollers 29 run on the upper side of guide ledge 12. Tension spring 26 biases entrainment element 19 in the direction of arrow 33 against carrier side 11 and thus causes the lateral guidance of the carrier to be effected without play in the curve by pressing guide rollers 31 against the side of curved guide ledge 12. Opposite lateral guide rollers 32 are not used for guidance in the curved section of the conveyor but only along the straight courses thereof. Greater width 14 of guide ledge 13 is required to make certain that underside 30 of carrier 8 remains supported along the entire arc over the chord formed by carrier side 11.

In the modification illustrated in FIG. 3, like reference numerals refer to like parts functioning in an equivalent manner to that described hereinabove in connection with FIGS. 1 and 2, this structure differing in that no guide ledge connects the two straight guide ledges 6 at the inside of the curved conveyor section where turntable 34 is mounted. Workpiece carrier 8 rests along the one carrier side directly on the upper side of turntable 34 while the opposite carrier side is supported for vertical guidance on curved guide ledge 12. In this embodiment, the carrier is entrained not only by entrainment elements 19 but also by the turning turntable, the weight of the carrier producing a corresponding friction force between the upper side of the turntable and the underside of the carrier whereby the carrier is driven by the turntable. This has the advantage that the entrainment force need not overcome the friction between underside 30 of carrier 8 and guide ledge 13.

FIG. 4 illustrates the engagement between carrier side 11 and conveyor roller 10 in the above-described embodiments. The conveyor roller presses guide rollers 35 without play against opposite lateral guide side 36 of guide ledge 5. The conveyor roller is frusto-conical and yieldably deformable and distance 37 in a central transverse plane of the rollers is smaller than radius 38 of the roller in this plane in a pressure-free condition. This will produce the required biasing force to assure the tolerance-free guidance of the carrier. The roller will be elastically deformed when conveyor roller 10 presses rollers 35 against side 36 without play because distance 39 between lateral guide side 36 and carrier side 11 exceeds the difference between distance 40 between rotary axis 41 of the conveyor roller and side 36 and radius 38. This elastic deformation of the conveyor roller produces a defined friction force at the interface between conveyor roller 10 and carrier side 11, which is enhanced by the work of deformation of the roller and thus increases the entrainment force.

FIG. 5 illustrates that the cooperating shapes of conveyor roller 10 and engaged carrier side 11 not only produce lateral biasing force 42 (see arrow in FIG. 4) but also vertical downward pressure force 44 to bias the carrier against upper faces 43 for vertically guiding the carrier on guide ledges 5, 6. If angle 45 between a line extending parallel to rotary axis 41 and carrier side 11 exceeds angle 47 between this line and the generatrix of the circumference of the conveyor roller, the portion of the conveyor roller facing vertical guide face 43 is more heavily deformed and the vertical component of this deformation force enhances the downward pressure. If carrier 8 tended to turn about guide rollers 35 engaging side 36 and to lift it off guide face 43 against the bias of force 44, such a torsion force would further asymmetrically deform conveyor roller 10 and progressively increase the downward pressure, thus assuring a lasting and accurate vertical and lateral tolerance-free guidance of the carrier even under very difficult operating conditions. Angle 45 may be 5° and angle 47 may be 4°.

The opposite inclination of the engaging carrier side 11 and entrainment elements 7, 10 assures the vertical and lateral guidance of carrier 8 without play while the carrier is advanced in the conveying direction. The indicated preferred angles will so jam the carrier between the conveyor rollers and the guide track that the resultant force will strongly hold the carrier in the guide position and will hold the carrier very steadily, regardless of its weight.

FIG. 6 illustrates conveyor roller module 48 comprising frusto-conical conveyor roller 10 having an elastically deformable surface for engagement with the one carrier side. The conveyor roller is supported on one end of drive shaft 52, being held thereon for rotation therewith by pin 67. In the illustrated embodiment, the surface of the roller is provided by a polyurethane foam on metal sleeve 66. Drive pinion 57 is freely rotatably mounted on an opposite end of the drive shaft between two friction pads 55 and 58. Bushing 50 is positioned between conveyor roller 10 and pinion 57. Two bearings 51 journal drive shaft 52 in bushing 50 and safety ring 53 positions the drive shaft longitudinally with respect to the bearings while pin 54 holds friction pad 55 in position on the drive shaft adjacent the bushing for rotation therewith. The drive shaft is positioned axially with respect to bushing 50 by a first safety ring 53 and bearings 51 have facing faces and are held in position by safety rings 56, 56 adjacent the bearing faces, spacer ring 64 being positioned between safety rings 56. Friction pad 58 is keyed to the drive shaft for rotation therewith by pin 59 engaged in axially extending groove 60 defined in the drive shaft so that the friction pad may be axially adjusted on the drive shaft. Annular compression spring 61 is biased against friction pad 58 and disc 62 supports the compression spring on drive shaft 52. Safety ring 63 holds supporting disc 62 in position. In this manner, drive pinion 57 is pressed between the friction pad to entrain the drive shaft when the pinion is driven. Bushing 50 has attachment flange 49 at an end facing the drive pinion and the flange defines bores for receiving attachment bolts which mount the conveyor roller module on machine table 65. This makes it possible to exchange the module readily and to replace it in case of a breakdown. The mounting of the annular compression spring makes it possible to pre-select the friction applied to drive pinion 57 so that the friction coupling requires no subsequent adjustments and manipulation at installation.

After module 48 has been installed, a drive chain or belt may be trained over pinion 57 for rotating the drive shaft. The drive force will depend on the friction force exerted upon the drive pinion by friction pads 55 and 58, which constitute a slip clutch. For example, if carrier 8 is held stationary in a work station by suitable mechanical stops or clamps, the stopping force exceeds the friction force applied to drive pinion 57 and the drive shaft rotating the conveyor roller will no longer be driven. The conveyor roller stands still and the freely rotatable pinion idles on the drive shaft. A suitable selection of the compression force of spring 62 will enable conveyor roller module 48 to be adapted to various workpiece and carrier weights so that the carrier will be suitably conveyed while avoiding undue wear of the conveyor rollers.

In the modification of conveyor roller module 48 shown in FIG. 7, bearings 51 for drive shaft 52 are farther spaced apart axially than in the afore-described embodiment. This will enable the tilting moment produced by lateral pressure force 42 to be better absorbed. Furthermore, instead of a cup spring, coil spring 68 presses friction pad 58 against drive pinion 57. The bias of the coil spring may be readily adjusted by turning adjustment nut 69 to obtain the desired friction force. As illustrated, guide rollers 70 support the carrier on upper face 43 of the guide ledges.

In the embodiment of FIG. 8, the transport device is link chain 71 and entrainment elements 73 are arranged thereon successively in conveying direction 72 for engagement with the one carrier side, respective link chains 71 in successive sections 74, 75, 76, 77 in the conveying direction being independently adjustable in a direction transverse thereto. The successive conveyor sections may be work or processing stations along an assembly line and the entrainment elements may be jaws of elastic synthetic resin having a convex surface facing the one carrier side engaged thereby. For the independent transverse adjustment of the link chain, it is guided in U-shaped chain guide parts 78 open towards the one carrier side and coil springs 79 independently support abutting guide parts 78 on the machine table for adjustment in a transverse direction. The bias of the coil springs also determines pressure 42 of entrainment elements 73 against the one carrier side and assures sufficient friction therebetween to cause the entrainment elements to advance the carrier when the link chains are driven. This arrangement combines the cost advantages of a transport device extending over a considerable length of the conveying path with the assured transmission of the required drive force to the workpiece carrier. The transversely adjustable positioning of the link chains with their entrainment elements reduces the wear on the entrainment elements in the same mannner as hereinabove described because the transport devices will yield and the entrainment elements will be disengaged from the one carrier side when the carrier is held stationary by a stopping force superior to the bias of springs 29.

FIG. 9 shows an assembly line with work or processing station modules 80, 81, which are independently operable units of the type described in my above-mentioned patent applications, and each module has an independent link chain 71 associated therewith. Since each link chain may be transversely adjusted with its entrainment elements 73, the drive force for the link chain may be reduced when the carrier is held in the range of a work station or in a waiting station on the module, and the wear of the entrainment elements as well as of the one carrier side engaged thereby is correspondingly reduced.

In the embodiment of FIG. 10, the entrainment elements of advancing means 86 are endless belts 83, 84 revolving about axes 82 extending substantially perpendicularly to a plane on which carrier 8 for workpiece 87 is conveyed. Preferably, the belts have side faces 85 engaging carrier side 11, which are inclined towards the carrier side relative to axis 82. This assures a secure engagement of the entrainment elements with the carrier side at an exactly defined location for transmitting the required frictional driving force thereto. In this manner, the lateral guidance of the carrier without play is assured in a dependable way.

In the embodiment of FIG. 11, several entrainment elements 91 are arranged in the conveying direction on each work or processing station 90, 91 so that carrier 8 may be advanced in conveying direction 92 independently along successive lengths of the conveyor in each station. If one carrier is stopped, other carriers may be advanced by adjacent entrainment elements. Since the entrainment belts are yieldable in a direction transverse to the conveying direction and pulleys 93 over which belts 83, 84 are trained are adjustably mounted, the belts may yield laterally and wear is reduced while enabling selected carriers to be held stationary while others are advanced.

FIGS. 12 to 15 illustrate embodiments of the conveyor arrangement according to the present invention wherein the advancing means and the one guide track side are arranged in the range of, and are associated with, the one carrier side.

Referring now to FIG. 12, there is shown machine table 101 at a work station of assembly line 102, the machine table supporting conveyor arrangement 103, parts manipulating device 104 and delivery device 105 for delivering parts 106 to the work station for processing and/or assembly. The conveyor arrangement serves to convey workpieces 107 on carriers 108 along the assembly line.

In this embodiment, support ledges 111, 112 constitute carrier sides 109, 110. The support ledges have inside faces 121, 122 and outside faces 113, 114. Guide elements 132 are mounted on the support ledges and include guide elements 116, 117 mounted on the outside faces for vertically guiding carrier 108, these guide elements being rollers rotatably mounted on horizontal shafts 115, as well as additional guide elements constituted by rollers 119, 120 rotatably mounted on vertical shafts 118. The entrainment elements of carrier advancing means 124 are conveyor rollers 123 engaging inside face 121 of support ledge 111 and the entrainment elements have inclined entrainment faces. Facing inside faces 121, 122 of support ledges 111, 112 extend obliquely and diverge upwardly and rotary axes 125 of conveyor rollers 121 enclose angle 126 with the inside faces of the support ledges. In this manner, advancing means 124 biases guide rollers 116, 117 against upper faces 127 of guide ledges 129 which form the guide track for vertically guiding carrier 108 along upper faces 127 and laterally guiding the carrier along side faces 130, 131 of the guide ledges. These side faces of the guide ledges extend substantially parallel to inside faces 121, 122 of support ledges 111, 112 and are engaged by guide rollers 119, 120.

This arrangement permits a compact construction of the carrier advancing means and guide track. The surprising advantage thereof includes the requirement of only a single lateral guide while the advancing means itself shares in the lateral guide function. Since the carrier advancing means is associated with the one carrier side, the lateral guide and advancing means may be selectively arranged at either one of the opposite sides of the carrier, depending on the available space, while assuring an exact centering of the workpiece in a lateral direction. This greatly facilitates and reduces the time required for centering the workpieces and their carriers in each work or processing station and the costs of the conveyor arrangement is considerably reduced because special centering devices are no longer required at the work stations. Since the carrier is always guided laterally without play, shocks are avoided which could cause parts or workpieces loosely lying on the carrier to fall off the carrier. The use of support ledges at the sides of the carrier makes a proper transmission of the biasing forces possible and improves the engagement between the conveyor rollers and the side faces so that the friction conditions for the advancement of the carrier by the conveyor rollers may be accurately defined. The angle between the side faces and the rotary axes of the conveyor rollers produces a force component directed against the vertical guide faces, thus preventing the carrier from being lifted off the guide track. The described and illustrated guide track and cooperating guide rollers assures a very exact vertical and lateral guidance of the carrier with a few precision-produced guide parts. This further reduces costs while assuring the highest quality of the conveyor arrangement.

Of course, it is possible to provide prepared lateral guide faces 130, 131 on guide ledges 129 only where advancing means 124 is associated with the guide ledges. As explained in more detail in connection with FIGS. 6 and 7, conveyor rollers 123 may be driven by entrainment pinions 134 mounted on the conveyor roller shafts by slip clutches 133. Transmission belts or chains 135 connect the successively arranged pinions to each other and to central drive motor 136 mounted on assembly line table 101.

In the schematically illustrated arrangement of FIG. 13, successive pinions 134, 137 and 138 have different diameters so that, when all pinions are driven by a common drive 135, 136, the rotary speed of conveyor rollers 123 differs. This makes it possible continuously to delay the advancement of workpiece carrier 108 as it arrives at the respective work stations and, after the work has been completed thereat, continuously to accelerate the advancement of the carrier as it leaves the work station in conveying direction 139.

As shown in FIG. 13, where the nature of the work causes considerable downward pressure forces 140 to be exerted upon vertical guide faces 127, support ledge 141 may be arranged on the machine table to cooperate with ledge 142 arranged on support ledges 111, 112 of carrier 108. Cooperating ledges 141, 142 are so arranged that guide elements 128 of the carrier (which have been shown enlarged for a better understanding of this feature) are lifted off upper faces 127 of the guide ledges when carrier 108 enters the work station. In practical operations, it suffices if the carrier is lifted only a few tenths of a millimeter to take the load off guide rollers 116, 117 whereby the high downward pressure forces are prevented from damaging either the guide rollers or the vertical guide faces. It is also possible to arrange glide rails between guide elements 128, the glide rails being arranged a slight distance above guide faces 127, for example 0.4. to 0.5 mm above the guide faces. In this case, it suffices to provide recesses in vertical guide faces 127 in the range of guide elements 128 at the work station, whose depth exceeds the distance between the glide faces and the vertical guide faces because carrier 108 will then be supported on the vertical guide faces by the glide faces and guide elements 128 will be relieved of pressure. Such a recess in guide face 127 is indicated in chain-dotted lines in the range of one of guide elements 128 in FIG. 13.

FIG. 14 shows that distance 143 being rotary axis 125 of conveyor roller 123, which is made of an elastic synthetic resin, and inside face 121 of the support ledge is less than radius 144 of the conveyor roller. This provides a well defined conveyor force since the friction force between the conveyor roller and the engaged side face of the support ledge is reinforced by the pressure force exerted by the deformation of the elastic roller.

As appears clearly from FIGS. 13 and 14, the length of support ledge 111 determines the number of conveyor rollers in engagement therewith. This, in turn, simply enables the conveyor speed and/or acceleration to be adapted to various carrier or workpiece weights. Also, as shown in FIG. 14, laterally projecting engagement pins 145 may be mounted on carrier 108 to center the carrier in the conveying direction at a work station. Mechanically operated abutment devices are arranged on the machine table immediately adjacent the carrier for cooperation with the engagement pins so that the workpiece carrier may be exactly positioned at the work station in a most economical manner.

Obviously, instead of using conveyor rollers as entrainment elements, any suitable friction drive elements, such as belts, chains and the like, may be used, as hereinabove described. However, it is of advantage if such elongated entrainment elements extend only along portions of the length of the conveyor path in conveying direction 139 so that carrier 108 may be conveyed independently along successive sections of the conveyor.

FIG. 15 shows a further embodiment of conveyor arrangement 103 which enables entrainment elements 146 and support ledge 150 having inside face 147 and outside face 149 engaged thereby to be arranged in the range of one carrier side 109 of workpiece carrier 108. The inside and outside faces are spaced apart a distance less than the distance between the opposite sides of the carrier and entrainment elements 146 are conveyor rollers 161 having elastically deformable surfaces arranged for engagement with inside and outside faces 147, 149 of support ledge 150. Guide elements 150' and 155 are mounted on the support ledge between the inside and outside faces. Depending on the position of entrainment elements 146 adjacent inside face 147 or outside face 149, lateral guide face 151 or 152 is arranged alternately for engagement with lateral guide rollers 150' so that this guide face is opposite the respective entrainment element. This makes it possible to use a single support ledge while the advancing means may be selectively arranged between the vertical guide faces and outside thereof. Only vertical guide element 154 in engagement with vertical guide face 154 need be used in the range of opposite carrier side 110 to assure the vertical guidance of the workpiece carrier, the lateral guidance thereof being effected solely in the range of the one carrier side 109 where the vertical guidance is effected by guide roller 156 engaging vertical guide face 158.

As shown in the drawing, upper face 158 for vertically guiding guide rollers 156 and side face 151 for laterally guiding guide rollers 150' are defined on a guide ledge, the guide ledge side face extending substantially parallel to faces 147, 149 of support ledge 150 and guide rollers 150' being rotatable about a vertical axis, side face 152 being defined on an additional guide ledge and side faces 151, 152 of the guide ledges being spaced apart distance 157 exceeding the diameter of guide rollers 150'. This arrangement enables entrainment elements 146 of carrier advancing means 159 to be arranged selectively within or outside vertical guide faces 158 or 154. In this way, the area between the vertical guide faces may be kept open so that the underside of carrier 108 is readily accessible. In this case, it is also possible to arrange lateral guide rollers 150' outside the vertical guide faces.

Faces 147, 149 of support ledge 150 constituting each carrier side 109, 110 are inclined towards each other and entrainment elements 146 engage a respective one of these faces. This again assures that a force component is directed against the support ledge in the direction of vertical guide face 158 to assure the exact vertical guidance of the workpiece carrier. While advancing means 159 may be selectively arranged along different sides of the carrier, they will always be in a protected position below the carrier and any parts falling off the carrier during work at the work stations cannot be wedged between the side faces and the associated advancing means, thus preventing jamming of the conveyor arrangement.

In the illustrated embodiment, the guide track comprises two guide ledges associated with carrier sides 109, 110 and the guide ledges are spaced farther apart in a direction transverse to the conveying direction than support ledges 150 associated with the two carrier sides. The support ledges project downwardly from the carrier towards the guide ledges.

As shown, workpiece carrier 108 may be advanced in the conveying direction either by means 159 shown in full lines or means 159 shown in broken lines, one being associated with inside face 147 and the other one being associated with outside face 149 to press lateral guide roller 150' respectively against guide face 151 or 152 for laterally guiding the carrier therealong without play. This will exactly center the workpiece carrier.

In the embodiments of FIGS. 12 to 15, the carrier is laterally guided along side 130 or 151 while advancing in one direction while being guided without play along side 131 or 152 during advance in the opposite direction. The accuracy of the lateral guidance is obtained by the precise machining of guide faces 130, 131, 151, 152 and associated guide elements 132, 150'. Lateral biasing force 160 presses the entrainment elements in the direction of the lateral guide side in the manner hereinabove described.

With the use of individual drives, such as conveyor rollers, for the carrier advancing means, it is particularly advantageous that the drives are substantially free of any load when the carrier is held stationary so that the driving force may be held relatively low when a number of carriers along an assembly line are stopped at a work station while only a few are advanced. Nevertheless, the stationary carriers will not prevent the advancement of other carriers by the same drive motor and no wearing friction will occur between the individual drives and the stationary carriers because of the described and illustrated drive arrangement. If endless belts or chains are used as individual drives, it will be useful to equip them with elastic or pivotal entrainment elements so as to avoid frictional engagement between the entrainment elements and the stationary carriers.

What is claimed is:

1. A conveyor arrangement for conveying a workpiece carrier in a conveying direction, the carrier having two opposite sides, and a guide means for vertically and laterally guiding the carrier in said direction, the guide means comprising
   (a) a means associated with one of the carrier sides for advancing the carrier in the conveying direction, the advancing means including
      (1) a succession of entrainment elements engaging the one carrier side, and (2) a turning transport device, the entrainment elements being circumferentially arranged on the transport device for engagement of successive ones of the entrainment elements with successive points on the one carrier side upon turning the device, (b) a guide track of two guide ledges supporting the carrier for vertical guidance therealong and having respective sides spaced apart in a direction transverse to the conveying direction and extending in the conveying direction, one of the guide track sides being opposite the advancing means in the transverse direction for laterally guiding the carrier, the one guide track side being associated with the opposite carrier side, and the advancing means being arranged to bias the carrier towards the one guide track side, and (c) guide elements mounted on the carrier and guided without play along the one guide track side.

2. The conveyor arrangement of claim 1, wherein the entrainment elements are adjustably positionable on the turning device in a direction transverse to the conveying direction.

3. The conveyor arrangement of claim 2, wherein the turning device is a turntable rotatable about an axis, the entrainment elements are equidistantly arranged along the circumference of the turntable and are radially adjustably positionable on the turntable.

4. The conveyor arrangement of claim 3, wherein the entrainment elements are elastic guide rollers.

5. The conveyor arrangement of claim 3, further comprising a pivotal arm carrying each one of the entrainment elements, the pivotal arm having two ends, a pivot supporting the pivotal arm intermediate the ends thereof on the turntable, the entrainment element being mounted at one end of the pivotal arm, a tension spring connecting the other end of the pivotal arm to the turntable, and an adjustable stop on the turntable for determining a respective pivotal end position of the arm for adjustably positioning the entrainment element.

6. The conveyor arrangement of claim 3, wherein the guide ledges are associated with the carrier sides, the guide ledges forming a curve, and the turntable being arranged on the inside of the curve.

7. The conveyor arrangement of claim 6, wherein the turntable has a radius exceeding the distance between the axis of the turntable and an end position of the entrainment element remote from the axis.

8. The conveyor arrangement of claim 1, wherein the entrainment elements have engagement faces engaging the one carrier side, the engagement faces being inclined towards the one carrier side relative to a vertical plane extending in the conveying direction, the angle of inclination between the vertical plane and the engagement faces being smaller than the angle between the one carrier side and the vertical plane, and further comprising a guide surface vertically guiding the carrier in the conveying direction, the angle between the one carrier side and the guide surface being less than 90°.

9. The conveyor arrangement of claim 8, wherein the angle between the one carrier side face and the vertical plane is about 5° and the angle of inclination between the vertical plane and the engagement faces inclined in an opposite direction is about 4°.

10. The conveyor arrangement of claim 1, wherein the entrainment elements are frusto-conical conveyor rollers having an elastically deformable surface for engagement with the one carrier side, and the advancing means further comprising a drive shaft for each one of the conveyor rollers, the conveyor roller being supported on one end of the drive shaft, and a pinion freely rotatably mounted on an opposite end of the drive shaft between two friction pads.

11. The conveyor arrangement of claim 10, further comprising a bushing positioned between the conveyor roller and the pinion, the bushing being coaxial with the drive shaft, a first bearing and a second bearing supporting the drive shaft in the bushing, a first safety ring holding the bushing axially in position, the bearings having facing faces and two safety rings abutting the bearing faces supporting the bearings in the bushing, the bushing having an attachment flange at an end facing the pinion, the flange defining bores for receiving attachment elements.

* * * * *